Figure 1:
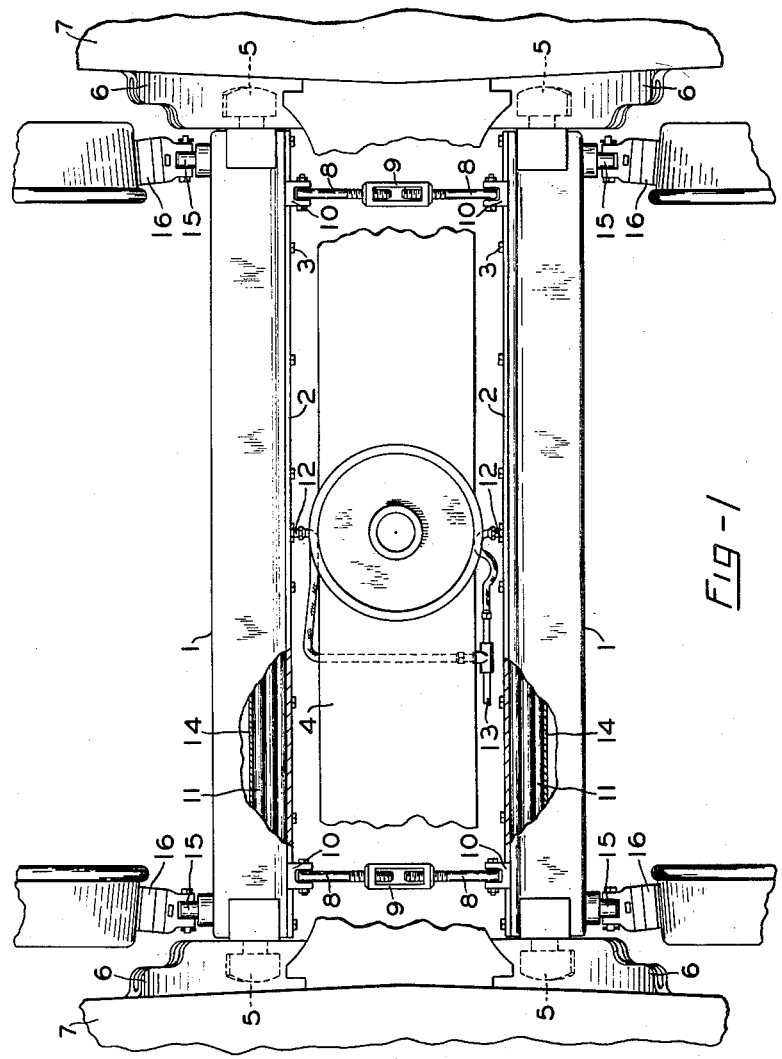

Jan. 23, 1962  C. R. BAECHTEL  3,017,959
FOUNDATION BRAKE APPARATUS
Filed April 29, 1959  2 Sheets-Sheet 1

INVENTOR.
CLARENCE R. BAECHTEL
BY
ATTORNEY

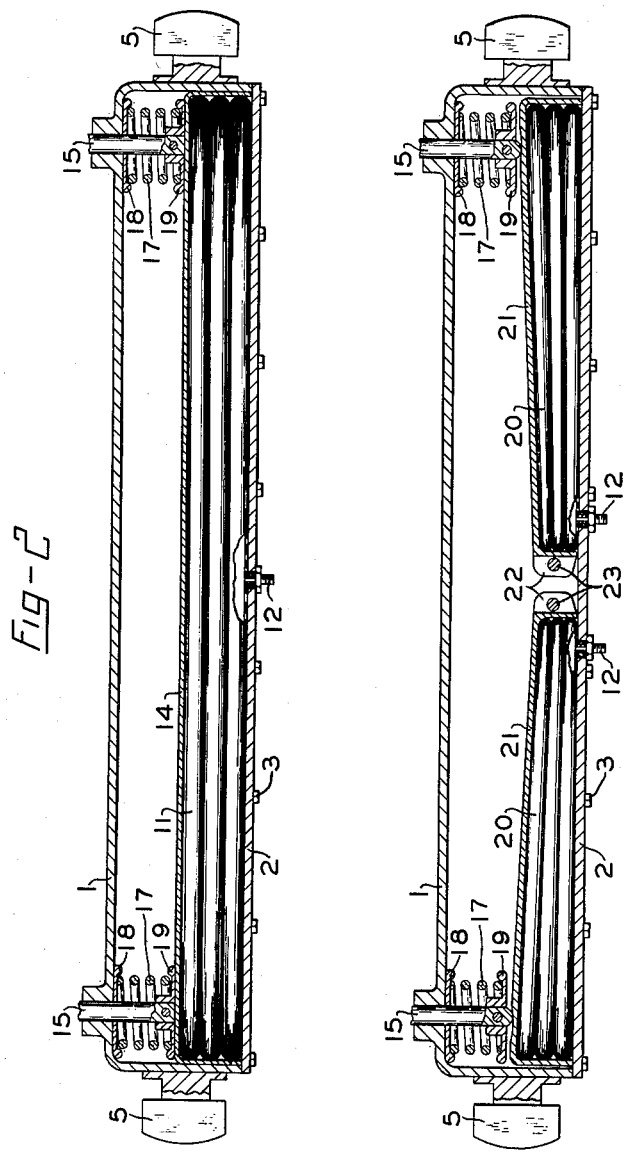

United States Patent Office 3,017,959
Patented Jan. 23, 1962

3,017,959
FOUNDATION BRAKE APPARATUS
Clarence R. Baechtel, Bay Village, Ohio, assignor to Westinghouse Air Brake Company, Wilmerding, Pa., a corporation of Pennsylvania
Filed Apr. 29, 1959, Ser. No. 809,730
13 Claims. (Cl. 188—52)

This invention relates to foundation brake apparatus for railway cars and car trucks and more particularly to novel car truck foundation brake apparatus comprising expansible brake actuating means adapted to operate within beam members supported after the manner of brake beams of conventional brake rigging.

Railway car foundation brake equipment in use today comprises essentially a power cylinder and a system of rods, levers, beams, and hangers supported on the bottom of the car body or on the car truck for transmitting force from the brake cylinder to brake shoes arranged for movement into and out of contact with the tread surface of the car wheels. The above conventional type of foundation brake equipment is of considerable weight and therefore adds excess weight to the car. In addition, the many parts are subject to constant wear requiring servicing, adjustment, repair or replacement and resulting in undesirable maintenance cost.

Various arrangements have been proposed and employed to simplify and improve the conventional type of foundation brake equipment, all with the idea of confining the foundation brake apparatus to the car truck itself.

It is the purpose of the present invention to provide novel foundation brake apparatus which is simple and compact in construction and which is confined entirely to the car truck, said novel apparatus comprising power exerting means which applies a force to, and actuates, the brake shoes into braking engagement with the wheels of a railway car truck directly and without intervening rods, links and levers.

According to this invention, there is provided an improved foundation brake apparatus of the above general type comprising hollow beam members adjustably fixed to and carried by the side frames of a railway car truck at opposite sides of and in substantially parallel relation to each other and to the transversely extending truck bolster. A resilient expansible element, serving as a power cylinder, is disposed within each beam member and upon inflation by fluid pressure supplied thereto exerts a braking force via a follower plate and a plurality of push rods, directly on the brake shoes. In a modified form of the invention, a plurality of expansible elements are pivotally carried within the beam members for individually exerting force on a push rod and brake shoe.

In the accompanying drawing, FIG. 1 is a plan view, showing the foundation brake apparatus embodying the invention, part of the beam members being broken away to show the expansible elements therein; FIG. 2 is a horizontal cross-sectional view, taken through a beam member of FIG. 1 showing one embodiment employing a single expansible element within the beam member; and FIG. 3 is a similar horizontal cross-section view, showing another embodiment employing a plurality of individual expansible elements in each beam member.

Description

The foundation brake apparatus embodying the invention is shown in the drawings (FIG. 1) associated with a railway car truck of the four-wheel type and comprises (FIGS. 1 and 2) a pair of generally U-shaped elongated casing members, hereinafter referred to as beam members 1, each having a cover plate 2 enclosing the open side and preferably secured thereto by screws 3.

Beam members 1 are arranged respectively at opposite sides of and parallel to a transverse truck bolster 4 with the cover plates 2 facing the bolster 4 in spaced back-to-back relation. Attached to each end of members 1, as by welding, is a guide foot 5, each guide foot being slidably supported within a respective guide channel member 6 formed on or attached in corresponding locations to the inboard side of the usual pair of truck side frames 7. Guide channel members 6 are inclined to the horizontal axis of the car truck and slope in a downward direction toward the bolster 4 for reasons which will be explained later.

Beam members 1 are manually adjustable longitudinally of the car truck toward or away from each other to vary the spacing therebetween, by a plurality of rods 8 and turnbuckles 9, illustrated as two, interposed between the members 1. The rods 8 have screwthreaded connection at one end with the turnbuckles 9 and at their opposite ends are pivotally connected by such as a pin to a lug 10 secured to a corresponding cover plate 2 by such as welding. Beam members 1 remain in fixed positions to which they are adjusted, during application and release of brakes in the manner hereinafter to be described.

Disposed within each beam member 1, adjacent the inner side of cover plate 2, is a resilient expansible bag or element 11, of the bellows type, which is inflatable with a gas, such as air, through a fitting 12 that extends exteriorly of each beam member 1 through openings in cover plate 2. Fittings 12 are connected to a control pipe 13 to which fluid under pressure is supplied for effecting a brake application and from which fluid under pressure is vented for effecting a release of brakes in a manner to be explained later. The control pipe 13 may be, for example, the brake cylinder pipe connected to a brake control valve such as the well-known AB type.

A movable follower plate 14 is disposed lengthwise within each beam member 1 adjacent the side of expansible element 11 opposite the cover plate 2 side and has its end portions turned at right angles to its face, the end portions fitting closely around the expansible element 11 and having sliding contact with the inner surface of the end walls of a respective beam member 1.

Push rods 15, one for each respective wheel, having brake shoes 16 operatively connected thereto at their one end, extend interiorly of the beam members 1, being slidably supported intermediate their ends in said beam members, and at their other end are adapted to engage the follower plate 14. Upon charging and subsequent expansion of the expansible elements 11, the elements 11 exert a force against the follower plates 14 which move the push rods 15 and therefore the brake shoes 16 for causing the brake shoes 16 to engage the car wheels and to brake the car truck.

Helical return springs 17, one for each push rod 15, are provided for biasing the brake shoes 16 out of engagement with the car wheels following a brake application. These return springs 17 each axially surround, within beam members 1, a corresponding push rod 15 and are retained between a pair of retainer collars 18 and 19, the former being backed up by the beam member 1 wall and the latter being fixedly secured to the inner end of a corresponding push rod 15 by such as a pin, respectively.

It will be understood that the brake shoes 16 are adjusted, prior to operation of the foundation brake apparatus, so as to provide the normal spacing of the brake shoe 16 from the wheels, by selective manual operation of the turnbuckles 9 to correspondingly space the beam members 1. It will also be understood that the guide channel members 6 are inclined to provide radial movement of the push rods 15 and of the brake shoes 16 toward the car wheel.

In operation, assume initially that the control pipe 13 is vented, that expansible elements 11 are deflated and that the other respective components of the foundation brake apparatus are in a brake release position in which they are shown in the drawings.

When a brake application is effected in the usual manner, fluid under pressure is correspondingly supplied to the control pipe 13 and thus to the expansible elements 11, causing the elements 11 to expand. When the pressure of fluid in the elements 11 exceeds the force of helical return springs 17, the elements 11 expand further against the force of return springs 17, thus moving the follower plates 14, push rods 15, and brake shoes 16 outwardly from the bolster 4 to cause brake shoes 16 to frictionally engage the treads of corresponding wheels for causing braking of the railway car.

To release the brakes on the car truck, the control pipe 13 is vented, thereby causing the expansible elements 11 to deflate whereby the helical return springs 17 will urge the follower plates 14, retainer collars 19, push rods 15 and brake shoes 16 in a direction inwardly toward the truck bolster 4, thus causing disengagement of the brake shoes 16 from the treads of the wheels.

*Description—FIG. 3*

In FIG. 3 another embodiment of the foundation brake apparatus is shown, and for purposes of identification components of this embodiment which are similar to those of the preferred embodiment shown in FIGS. 1 and 2, will be designated by the same reference characters.

According to the construction of this embodiment, each beam member 1 has disposed therein multiple expansible elements 20 and multiple follower plates 21 arranged in end-to-end order adjacent the cover plate 2 with each follower plate 21 fitting closely around the ends of a respective element 20. Multiple expansible elements 20 have separate respective fittings 12 for connection to a common control pipe 13.

Each multiple follower plate 21 is fulcrumed at its inner end, which is provided with integrally formed follower lugs 22 having transverse bores through the wall thereof, on pins 23 that extend vertically through the beam members 1 and said bores.

The inner ends of push rods 15, which are rounded or ball-shaped, extend beyond the outer face of retainer collars 19 and engage a concave surface or recess formed on the face of multiple follower plates 21 in ball-in-socket engagement for exerting the force of helical return springs 17 on the multiple follower plates 21.

In operation, upon a brake application and supply of fluid under pressure to the multiple expansible elements 20, the latter will expand and move the multiple follower plates 21 arcuately about the pins 23 against the force of helical springs 17 acting through the inner ends of push rods 15, and thereby move the push rods 15 and brake shoes 16 outwardly from the bolster 4 and into braking contact with the treads of the wheels of the car. Upon a brake release, and deflation of the multiple expansible elements 20, the helical springs 17 acting through the inner ends of push rods 15 will force the multiple follower plates 21 and push rods 15 toward the bolster 4 for disengaging the brake shoes 16 from the treads of the wheels of the car truck.

Having now described the invention, what I claim as new and desire to secure by Letters Patent, is:

1. Foundation brake apparatus for use with a railway car truck of the multi-wheel type having side frames, said apparatus comprising a pair of spaced hollow beam members extending transversely of the truck adjacent the wheels and supported adjacent their ends on said side frames, at least one resilient expansible bellows-like element disposed in each of said beam members and being chargeable with fluid under pressure, said expansible elements each being arranged in said respective beam members against one wall thereof so as to provide an expansion force in the direction of the adjacent wheels, a push rod for each of the wheels, each push rod being slidably supported by a corresponding beam member and having within the beam member one end subject to the expansion force of a corresponding expansible element, and a brake shoe for each of the wheels, each brake shoe being operatively connected to the other end of a corresponding push rod and being operated into braking engagement with its associated wheel by the expansion of the corresponding expansible element upon charging of the latter with fluid under pressure.

2. Foundation brake apparatus, according to claim 1, further comprising means for biasing said brake shoes to a brake release position upon deflation of said expansible elements.

3. Foundation brake apparatus according to claim 1, further characterized by guide feet on the ends of said beam members, which guide feet are slidably movable within guide members formed on the inboard side of each side frame to support said beam members, and by adjustable means connecting said beam members for selectively positioning said beam members in different fixed spaced positions to each other within said guide members.

4. Foundation brake apparatus according to claim 1, further characterized by follower plates severally disposed within said beam members superposed over said bellows-like expansible elements in the direction of expansion thereof and intermediate said push rods and the corresponding expansible element for transmitting and equalizing the force exerted by the expansible elements to said push rods and said brake shoes.

5. Foundation brake apparatus for use with a railway car truck of the multi-wheel type having side frames, said apparatus comprising a pair of hollow beam members extending transversely of the truck adjacent the wheels and having guide feet on the ends thereof, guide members on the side frames of the car truck in which said guide feet are slidably supported, adjustable means connecting said beam members for selectively positioning said beam members in different fixed spaced positions to each other within said guide members, a single resilient expansible bellows-like element disposed in each of said beam members and being chargeable with fluid under pressure, said expansible elements being arranged in each of said beam members against one wall thereof so as to apply an expansion force in the direction of the adjacent wheels when said expansible elements are charged with fluid, a push rod for each of the wheels, each push rod being slidably supported by a corresponding beam member and having within the beam member one end subject to the expansion force of a corresponding expansible element, a brake shoe for each of the wheels, each brake shoe being operatively connected to the other end of a corresponding push rod and being operated into braking engagement with its associated wheel by the expansion of the corresponding expansible element upon charging with fluid under pressure, and means for biasing said brake shoes to a brake release position upon deflation of said expansible element.

6. Foundation brake apparatus for use with a railway car truck of the multi-wheel type having side frames, said apparatus comprising a pair of hollow beam members extending transversely of the truck and supported adjacent their ends on said side frames, a single resilient expansible element disposed in each of said beam members and being chargeable with fluid under pressure, said expansible elements being arranged in each of said beam members against one wall thereof so as to apply an expansion force in the direction of the adjacent wheels when said expansible elements are charged with fluid, a push rod for each of the wheels, each push rod being slidably supported by a corresponding beam member and having within the beam member one end subject to the expansion force of a corresponding expansible element, a follower plate slidable within each of said beam members and interposed between said expansible element and said push rod, a brake shoe for each of the wheels, each brake shoe being operatively connected to the other end of a corresponding push rod and being operated into braking engagement with its associated wheel by the expansion of the corresponding expansible element upon charging with fluid under pressure, and means for biasing said brake shoes to a brake release position upon deflation of said expansible element.

7. Foundation brake apparatus for use with a railway car truck of the multi-wheel type having side frames, said apparatus comprising a pair of hollow beam members extending transversely of the truck adjacent the wheels and having guide feet on the ends thereof, guide members on the side frames of the car truck in which said guide feet are slidably supported, adjustable means connecting said beam members for selectively positioning said beam members in different fixed spaced positions to each other within said guide members, a single resilient expansible element disposed in each of said beam members and being chargeable with fluid under pressure, said expansible elements being arranged in each of said beam members against one wall thereof so as to apply an expansion force in the direction of the adjacent wheels when said expansible elements are charged with fluid, a push rod for each of the wheels, each push rod being slidably supported by a corresponding beam member and having within the beam member one end subject to the expansion force of a corresponding expansible element, a slidable follower plate within each of said beam members and disposed intermediate said push rod and said expansible element for transmitting the force exerted by said expansible element to said brake shoe, a brake shoe for each of the wheels, each brake shoe being operatively connected to the other end of a corresponding push rod and being operated into braking engagement with its associated wheel by the expansion of the corresponding expansible element and actuation of said follower plate upon charging of the expansible element with fluid under pressure, and means for biasing said brake shoes to a brake release position upon deflation of said expansible element.

8. Foundation brake apparatus for use with a railway car truck of the multi-wheel type having side frames, said apparatus comprising a pair of hollow beam members extending transversely of the truck adjacent the wheels supported adajacent their ends on said side frames, a plurality of resilient expansible elements disposed in each of said beam members and each being chargeable with fluid under pressure, said plurality of expansible elements in each of said respective beam members being arranged against one wall thereof so as to apply an expansion force in the direction of the wheels, a plurality of push rods, each push rod being associated with a corresponding wheel and a corresponding expansible element and each of said push rods being slidably supported by a corresponding beam member and having within the beam member one end subject to the expansion force of the corresponding expansible element, and a brake shoe for each of the wheels, each brake shoe being operatively connected to the other end of a corresponding push rod and being operated into braking engagement with its associated wheel by the expansion of the corresponding expansible element upon charging of the latter with fluid under pressure.

9. Foundation brake apparatus according to claim 8 further characterized by guide feet on the ends of said beam members, which guide feet are slidably movable within guide members formed on the inboard side of each side frame to support said beam members, and having adjustable means connecting said beam members for selectively positioning said beam members in different fixed spaced positions to each other within said guide members.

10. Foundation brake apparatus according to claim 8 further characterized in that a plurality of slidable follower plates are disposed within each of said beam members, each of said follower plates being arranged intermediate a corresponding push rod and a corresponding expansible element for transmitting the force exerted by said expansible element to said brake shoe.

11. Foundation brake apparatus according to claim 8 further characterized in that a plurality of return springs is provided, each return spring encircling a corresponding push rod adjacent said other end of said push rod within said hollow beam member and disposed between the wall of said beam member and said expansible element, for returning a corresponding brake shoe to a release position out of engagement with the wheel upon deflation of a corresponding expansible element.

12. Foundation brake apparatus for use with a railway car truck of the multi-wheel type having side frames, said apparatus comprising a pair of hollow beam members having guide feet on the ends thereof, guide members on the side frames of the car truck in which said guide feet are slidably supported, adjustable means connecting said beam members for selectively positioning said beam members in different fixed spaced positions to each other within said guide members, a plurality of resilient expansible elements disposed in each of said beam members and being chargeable with fluid under pressure, a plurality of push rods, each push rod being associated with a corresponding wheel and a corresponding expansible element and each of said push rods being slidably supported by a corresponding beam member and having within the beam member one end subject to the expansion force of a corresponding expansible element, a plurality of slidable follower plates disposed within each of said beam members, each of said follower plates being arranged intermediate a corresponding push rod and a corresponding expansible element for transmitting the force exerted by said expansible element to a corresponding push rod, a brake shoe for each of the wheels, each brake shoe being operatively connected to the other end of a corresponding push rod and being operated into braking engagement with its associated wheel by the expansion of the corresponding expansible element upon charging of the expansible element with fluid under pressure, and a plurality of return springs, each return spring encircling a corresponding push rod adjacent said other end of said push rod within said beam member and disposed between the wall of said beam member and the corresponding follower plate, for returning a corresponding brake shoe to a release position out of engagement with the wheel upon deflation of a corresponding expansible element.

13. Foundation brake apparatus according to claim 12 wherein said follower plates are pivotally connected at one end to said beam members and are moved pivotally in one direction against the force of the corresponding return spring upon charging of the corresponding expansible element for causing a brake application, said follower plates being pivotally movable in the opposite direction by the force of the corresponding return spring upon deflation of the corresponding expansible element for causing a release of brakes.

References Cited in the file of this patent

UNITED STATES PATENTS

| 143,980 | Henderson | Oct. 28, 1873 |
| 598,766 | Campany | Feb. 8, 1898 |
| 607,069 | Nichols | July 12, 1898 |
| 655,376 | Schaffer et al. | Aug. 7, 1900 |
| 934,568 | Phillips | Sept. 21, 1909 |
| 2,940,545 | Hursen | June 14, 1960 |

FOREIGN PATENTS

| 2,594 | Great Britain | 1860 |
| 2,231 of 1853 | Great Britain | Sept. 29, 1853 |